United States Patent [19]

Chau et al.

[11] Patent Number: 5,751,792
[45] Date of Patent: May 12, 1998

[54] SYSTEM AND METHOD FOR PROVIDING A MESSAGE SYSTEM SUBSCRIBER WITH A ROAMING MAILBOX

[75] Inventors: Nga V. Chau, Herndon, Va.; Edward D. Eng, South Plainfield, N.J.; Henry H. Shen; Agnes C. Tow, both of Middletown, N.J.; Gang Yang, Holmdel, N.J.

[73] Assignee: AT&T Corp, Middletown, N.J.

[21] Appl. No.: 679,842

[22] Filed: Jul. 15, 1996

[51] Int. Cl.[6] .......................... H04M 3/50; H04M 15/00
[52] U.S. Cl. .................... 379/89; 379/112; 379/201; 379/207
[58] Field of Search .......................... 379/207, 201, 379/89, 88, 67, 112, 115

[56] References Cited

U.S. PATENT DOCUMENTS

| | | | |
|---|---|---|---|
| 4,899,373 | 2/1990 | Lee et al. | 379/207 |
| 4,933,967 | 6/1990 | Lo et al. | 379/207 |
| 5,113,430 | 5/1992 | Richardson, Jr. et al. | 379/88 |
| 5,406,557 | 4/1995 | Baudoin | 379/89 X |
| 5,572,578 | 11/1996 | Lin et al. | 379/89 |
| 5,608,783 | 3/1997 | Ichnowski et al. | 379/67 |

Primary Examiner—Thomas W. Brown

[57] ABSTRACT

An adjunct message system, coupled to a global telecommunications network, provides a roaming subscriber with roaming access to messages left at the subscriber's home mailbox by transferring such messages to a temporary roaming mailbox at a roaming node when the subscriber first calls to retrieve his/her messages. In addition, messages left at any node in the system will be transferred to the subscriber's home node. In both cases, international voice transport costs will be saved.

18 Claims, 4 Drawing Sheets

SYSTEM AND METHOD FOR PROVIDING A MESSAGE SYSTEM SUBSCRIBER WITH A ROAMING MAILBOX

FIELD OF THE INVENTION

Our invention relates to voice and data messaging and, more particularly, to a system for enabling a roaming subscriber to obtain messages from a home mailbox in a cost effective manner.

BACKGROUND OF THE INVENTION

Communication carriers provide personal communication services to subscribers including a broad array of messaging products and services, such as electronic mail and call answering voice-mail applications. Business use of sophisticated messaging technologies, especially those provided by electronic data interchange and fax store-and-forward applications, are increasing by leaps and bounds. Even a large section of the residential market is seeking an alternative to answering machines and have begun to subscribe to network-based voice-mail services that help to complete calls when the called party is either busy or doesn't answer. There appears to be a strong desire among all customer segments to have the ability to access and retrieve voice, text, fax and even video messages from a home mailbox.

The key to providing what customers want is doing it in a cost effective manner. When subscribers travel a long distance from their home or office, it has been necessary for them to place a long distance call to retrieve their messages. This increases the cost to the subscriber to access messages, especially if international transport costs are involved.

SUMMARY OF THE INVENTION

The present invention is directed to a system and method for enabling a message service provider to make a subscriber's messages stored at a home mailbox at a home node available at a roaming mailbox at a roaming node. When a subscriber accesses the messaging system at a roaming node to obtain his/her messages, the system establishes a roaming mailbox at the roaming node, copies the messages from the home mailbox to the roaming mailbox, and connects the subscriber to the roaming mailbox while copying the messages. This message system can be configured to automatically program this dynamic roaming function so that the process is transparent to the subscriber, or the subscriber can pre-register with the message service to establish a roaming mailbox at a specific voice node ahead of time.

Messages can also be left for the subscriber by accessing any node in the messaging system which will transport the messages to the home mailbox at the home node as well as to any roaming mailbox that has been established at a roaming node.

DETAILED DESCRIPTION

Figure 1:
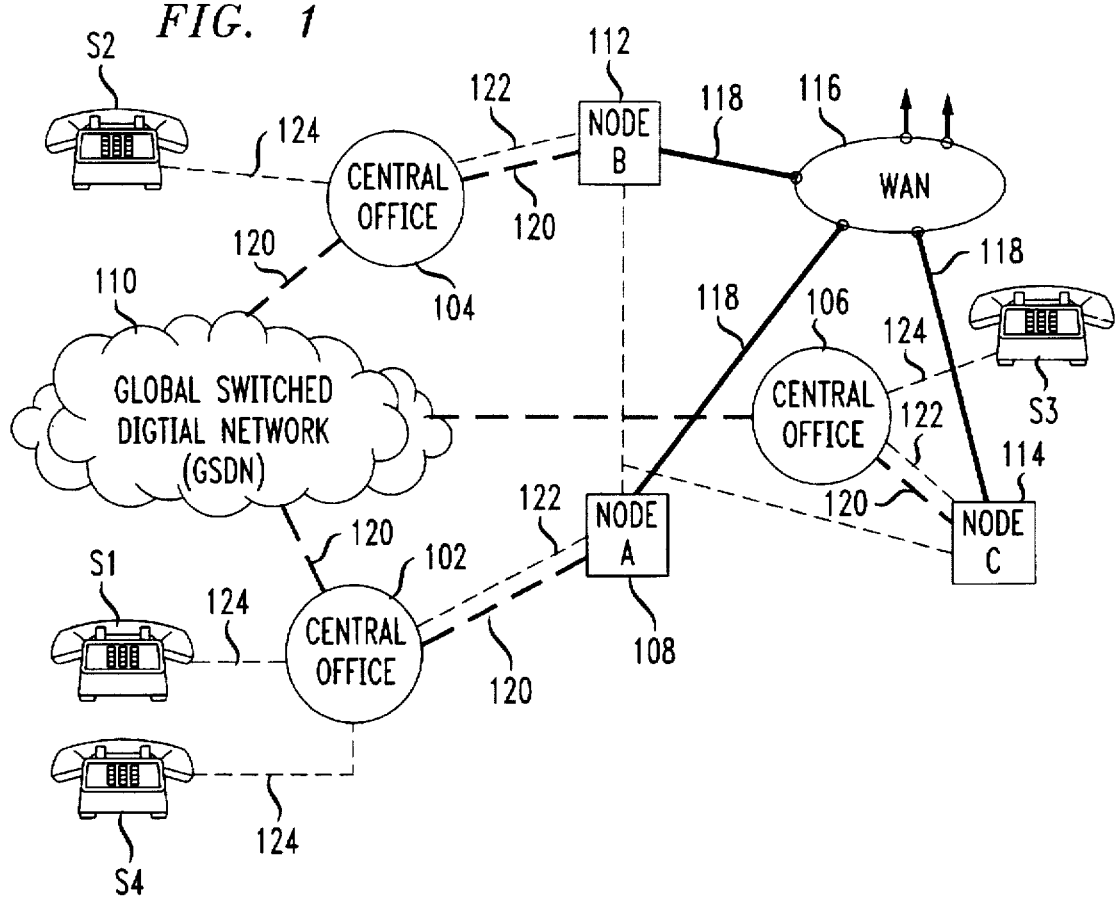
FIG. 1 is a schematic representation of a global view of a network illustrating the present invention.

An exemplary embodiment, a schematic view of global communication network 100, capable of supporting the adjunct messaging service of our invention is shown in FIG. 1. Station sets S1, S2, S3, S4 are connected to Central Offices (COs) 102, 104 and 106, respectively, maintained by a local exchange carrier (LEC) or a postal, telephone and telegraph company (PTT). The operation of a CO is well known and will not be discussed in detail. It suffices to say that a CO is arranged to send to an associated node, e.g., Node A, a call originating at a calling station set S1, e.g., a telephone, fax machine, video phone or multimedia device, which has dialed the appropriate number. A CO is also arranged to connect a call received from a calling station set, e.g., S1, to a called station set S4. A CO is further arranged to connect a calling station S1 to a local or a toll or an international switch (not shown), such as a No. 4 ESS (Electronic Switching System) or a No. 5 ESS; both available from Lucent Technologies, Inc.. This provides the means for connecting a calling station, e.g., S1 to a called station S2 or S3 in a foreign country or to a called station associated with another LEC (not shown) in the same country.

Included in network 100 are Node A(108), Node B(112) and Node C(114). Of course, there could be many more nodes connected to the adjunct messaging system of our invention. Wide area data network (WAN) 116, (such as AT&T Corp.'s wide area network, frame relay network, or a high bandwidth network, e.g., a future ATM Network) is utilized to provide data transport between Nodes 108, 112 and 114 and, as will be discussed below, to transport messages and messaging customer profile update information. The data interconnections denoted by solid lines 118 are 56 kbps private lines, for example. These lines can also be a higher bandwidth private line or the higher bandwidth of a switched packet network subscriber line. Dashed lines 120 denote data lines interconnecting COs 102, 104 and 106 with their respective nodes 108, 112 and 114 and global switched digital network 110 such as ISDN basic rate interface (BRI) line, on ISPN primary rate interface (PRI) line, T1 or E1, etc. Dotted lines 122 are voice lines connecting the central office and the nodes, such as Primary Rate Interface lines which serve as inbound 800/800 equivalent phone trunks to the messaging system for voice. The lines 122 may be T1/E1 or T3/E3 lines. Dotted lines 124 are voice lines connecting station sets to the central office.

Figure 2:
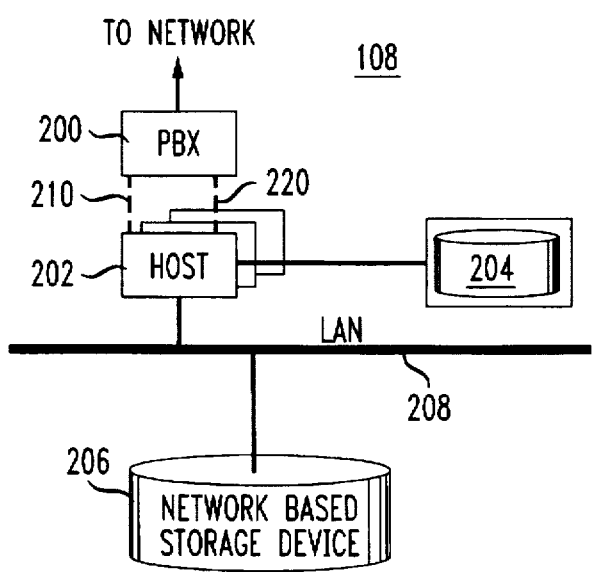
FIG. 2 is a schematic representation of a node of the present invention.

As nodes 108, 112 and 114 have essentially the same architecture, the following discussion of node 108 will pertain to all three. Referring to FIG. 2, a simplified block diagram of node 108 is shown. Private branch exchange (PBX) 200, which may be, for example, a DEFINITY G3R switch available from, Lucent Technologies, Inc., is an advanced business communication system. It handles voice and data communications simultaneously. The switching function can also be integrated in a host machine which in turn replaces the PBX200.

PBX 200, besides providing network access to node 108, functions to transfer calls between the network and the messaging equipment. It also provides remote access to mailboxes, i.e., memory locations for storing messages, through a WAN or a software defined network (SDN). PBX 200 routes calls to customer support centers and provides basic outbound calls for messaging delivery. In this application, PBX 200 is used as programmable switch fabric which is controlled by host 202.

The term "host" is a generic term for computers that can provide intelligent control functions. Hosting functions can be distributed in multiple computers with each performing different functions. Host 202 represents a hosting function performed on a single machine or on multiple machines of distributed architecture. Host 202, a part of which serves as a switch host to control a switch, performs such tasks as requesting the switch to setup a call, tear down a call, or conference in another party. The host 202 is connected to PBX 200 via a direct connection, such as BRI lines 210 or via a LAN to perform host functions. The voice unit provides the voice response and voice recognition functions to collect digits and play announcements, the fax unit to provide fax delivery and fax receiving functions are also housed in host 202. The voice unit connects to the PBX 200 via T1 or E1. Host 202 also serves as a messaging application host which provides the application callflow control function, and managing subscriber profile database 204.

The network based file servers are RAID (Redundant Arrays of Inexpensive Disks) drives as reliable disk storage device. Multiple storage devices should be used, however, only one file server 206 is indicated in FIG. 2 to illustrate the device which stores voice, fax, etc., message files. Local Area Network (LAN) 208, e.g., a fast ethernet switching hub, functions to connection host 202 and file server 206 within node 108.

Each subscriber is assigned a randomly system generated fixed length unique mailbox identification number (ID). Each subscriber also has a personal identification number (PIN) for security protection. The subscriber can also be assigned a mailbox alias number at the subscriber's own choice, so that it is easy for subscriber to remember the mailbox ID. Internally, the alias number is always mapped to the mailbox ID. Both mailbox ID number and the alias number are the keys for the subscriber profile database. Access to the messaging system can be accomplished by using digital tone multifrequency (DTMF) or voice recognition to access network 100 and entering the subscriber's mailbox ID or the alias number.

The alias number is used for non-subscribers to leave a message for the subscriber or for a subscriber to leave a message for another subscriber. Each subscriber also has a personal identification number (PIN). PINs, different from subscriber's PINs, may also be given to non-subscribers by a subscriber, so that they can have toll free access to the system or to access other features of the messaging system, e.g., the bulletin board, which is not part of this invention.

Designated 800/800 equivalent free phone or local access numbers are available to access the messaging system. Until such time as international standards are adopted to establish worldwide free phone access numbers, the access numbers in the various countries will be different. Further, the subscriber's access number may be different than the access number provided to non-subscribers authorized to leave toll-free messages in the subscriber's mailbox.

Part of the static primary data of the subscriber profile database is replicated at all nodes. It consists of subscriber static data such as mailbox ID, alias number, language selection, PIN, personal greeting, etc. However, the subscriber's home node is the primary node for the subscriber and is the only site that can change primary data, all other nodes are secondary to the subscriber and able to query the data but not able to change it. If the subscriber's primary node is down, one of the secondary nodes will become primary until the primary node is back in service. The secondary node will then update the primary node and resume its secondary status. Subscriber's profile data also includes roaming location data, the use of which will be described below, and message data.

Message data is replicated only at the home node and the roaming node. The home node is primary and the roaming node is secondary. Changes in message data will first be updated at the home node and then at the roaming node by the database server. This is so even if the message is recorded initially at a roaming node. The database server at each node always send data to the home node for update. The home node database server will determine if a roaming location needs to be updated, and if a message file needs to be transported.

Referring again to FIG. 1, a subscriber, for example, the subscriber associated with station S1, makes a trip to the Node C. When the subscriber accesses the system at station S3 to obtain his/her messages, the subscriber uses the number, which may be toll free, provided by the messages service for the Node C. The subscriber is connected to Node C and is prompted to supply his/her ID number and his/her PIN number. The system which has the subscriber's profile data at hand recognizes that the subscriber is roaming and initiates the creation of a roaming mailbox at node C. The message data at node A is then transferred to node C via WAN 116. The message service also subscribes to e.g., local ISDN, BRI or PRI lines 120 and global switched digital service (GSDS) 110 to provide the message transport function when the bandwidth of the WAN is not enough to carry the load. When overflowed messages are needed to be transported, the message service uses a Bandwidth on Demand (BOND) controller (not shown) to dial up GSDS 110 through ISDN lines 120. A subscriber can then obtain his/her messages from roaming node C. This process eliminates high international transfer toll charges for a lengthy international call to obtain messages or take advantage of any other features of the message service which he/she has subscribed to.

There are two ways a non-subscriber is allowed to record a message to be delivered to a subscriber's mailbox. First, the non-subscriber calls in the messaging system using the subscriber's alias number or other access number. In the second method, the non-subscriber calls the called party who is a subscriber. The call spontaneously activates the messaging feature in the case of a Busy or Ring No Answer at the called party's end. The non-subscriber will then be prompted to leave a message or elect some other feature of messaging system, e.g., the bulletin board feature. If the caller elects the bulletin board feature, he/she will be prompted to enter his/her PIN. If the PIN is validated, the caller is allowed to retrieve the bulletin board message. This feature, not only protects the message from being available to unauthorized parties, but also allows the calling party to be billed instead of the subscriber.

A message may be left at any node in the messaging system for any subscriber for the service. The cost benefits of transferring the call to the home mailbox or roaming mailbox of the subscriber will be realized in each case.

The preferred embodiment of this invention is an adjunct system, that is, it is not integrated into the overall network or CO. However, it would be clear to one skilled in the art that its features may be incorporated in an integrated network environment.

The foregoing is illustrative of the principles of the invention. Those skilled in the art will be able to devise numerous arrangements which, although not explicitly shown or described herein, nevertheless embody those principles that are within the spirit and scope of the invention.

Figure 3A:
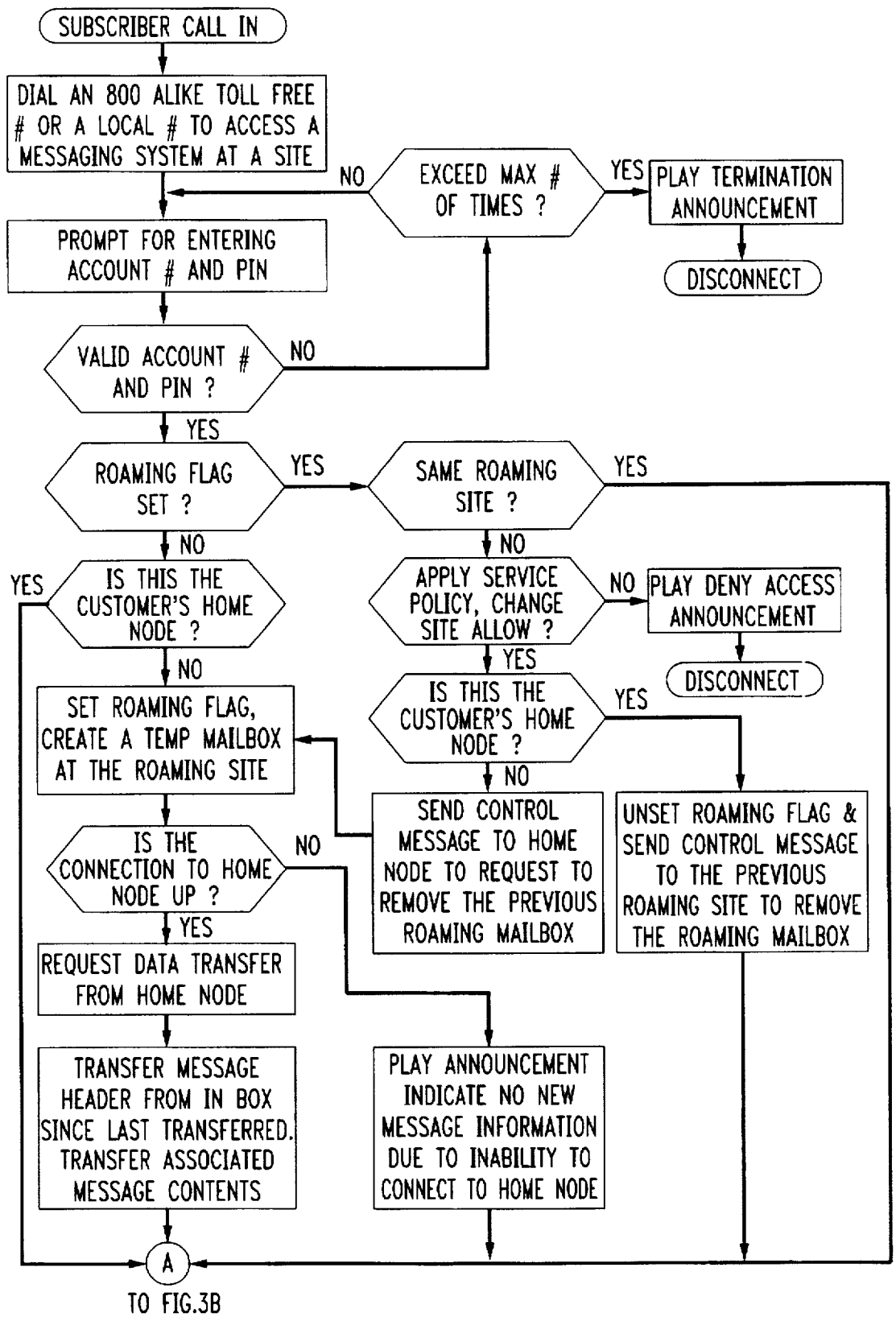
FIGS. 3 and 4 show an example of the call flow.
Figure 3B:
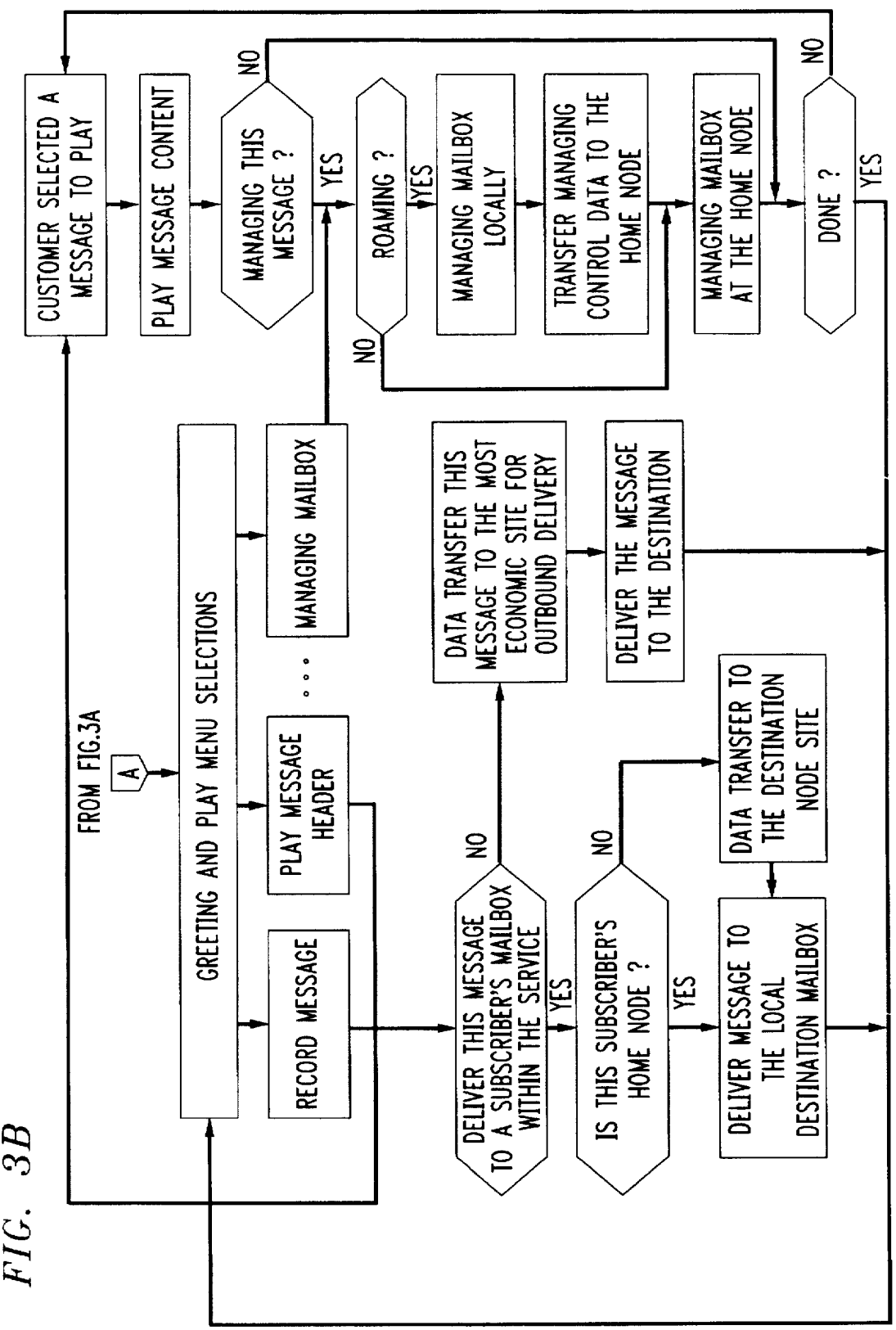
Figure 4:
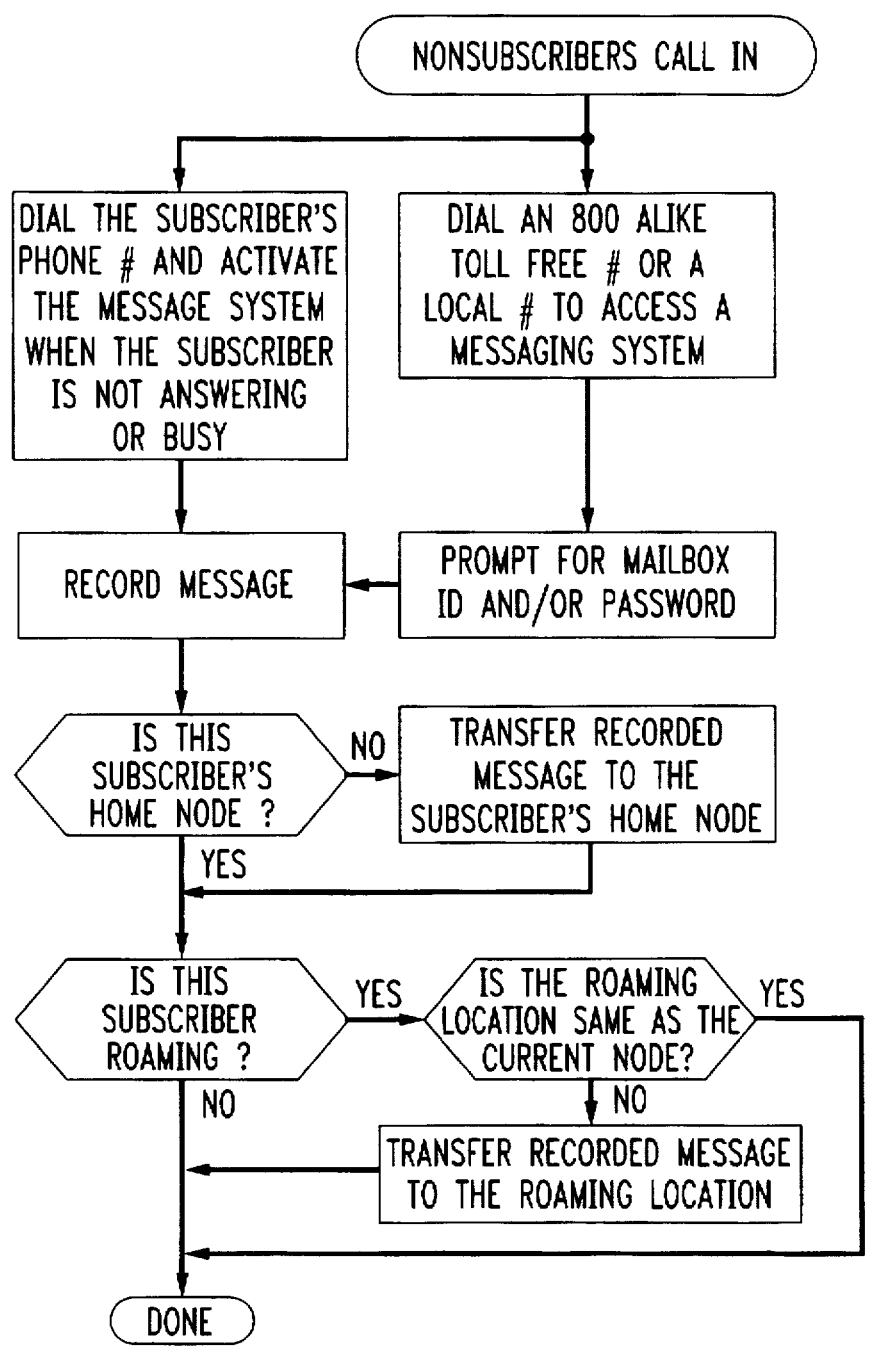

An example of the call flow can be found in the flow charts of FIGS. 3 and 4.

What is claimed is:

1. A method for providing a roaming subscriber with access at a roaming node to messages stored in a home mailbox at a home node, comprising the steps of:

accessing the roaming node;

establishing a roaming mailbox at the roaming node; and transferring the messages in the home mailbox to the roaming mailbox.

2. The method of claim 1 wherein accessing the roaming node comprises the steps of:

accessing a messaging account from a calling station; and identifying the subscriber's mailbox.

3. The method of claim 2 which further comprises obtaining caller access verification.

4. The method of claim 2 wherein the calling station is a telephone.

5. The method claim 2 wherein the calling station is a facsimile machine.

6. The method of claim 2 wherein the calling station is a computer.

7. The method of claim 2 wherein the calling station is a multi-media device.

8. The method of claim 1 wherein messages received at the home mailbox subsequent to the establishment of a roaming mailbox are automatically transferred to the roaming mailbox.

9. The method of claim 2 wherein the messaging account is an alias number.

10. The method of claim 2 wherein the messaging account is a toll free number.

11. The method of claim 2 wherein the messaging account is a local number.

12. The method of claim 2 wherein the messaging account is an Internet URL (Universal Resource location).

13. The method of claim 1 wherein the roaming node is in a different geographic location than that of the home node within a country.

14. The method of claim 1 wherein the roaming node is in a different country than that of the home node.

15. A method for reducing the international transfer costs associated with leaving a message for a message service subscriber at the subscriber's home mailbox when a calling party and the subscriber are in different countries, comprising:

the calling party accessing a message system at an in-country node; and transferring the message to the home mailbox of the subscriber.

16. A method for reducing the toll cost associated with leaving a message for a message service subscriber at the subscriber's home mailbox when the calling party and the subscriber are not in the same local exchange, comprising the steps of:

the calling party accessing a message system at a local node; and transferring the message to the home mailbox of the subscriber.

17. A system for providing a message service in a telecommunications network formed from a plurality of switches interconnected via respective communications paths and message nodes, including at least a home node and a roaming node, the arrangement comprising:

means at each node for storing each message service subscriber's profile data;

means for establishing a roaming mailbox at the roaming node when a roaming message service subscriber calls for messages; and means for transferring messages from the home mailbox to the roaming mailbox.

18. A method for providing a message service in a telecommunications network formed from a plurality of switches interconnected via respective communications paths and message nodes, including at least a home node and a roaming node, comprising:

storing in a node each message service subscriber's profile data;

establishing a roaming mailbox at the roaming node when a roaming message service subscriber calls for messages; and transferring messages from the home mailbox to the roaming mailbox.

* * * * *